March 6, 1951  J. C. ENGEBRETSON  2,544,260
ANCHORING DEVICE FOR CHECK ROW WIRES
Filed June 3, 1947  3 Sheets-Sheet 1

Inventor
John C. Engebretson

By Clarence A. O'Brien
and Harvey B. Jacobson
Attorneys

March 6, 1951 J. C. ENGEBRETSON 2,544,260
ANCHORING DEVICE FOR CHECK ROW WIRES
Filed June 3, 1947 3 Sheets-Sheet 2
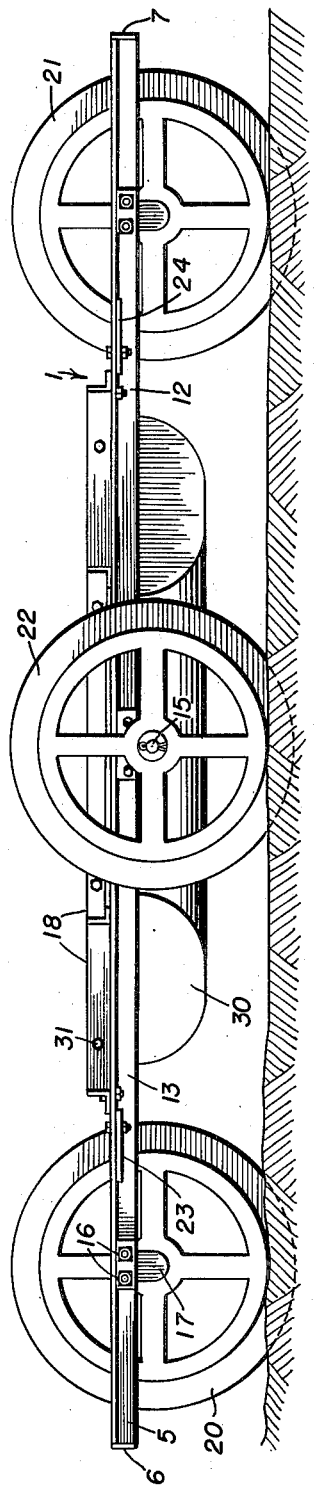
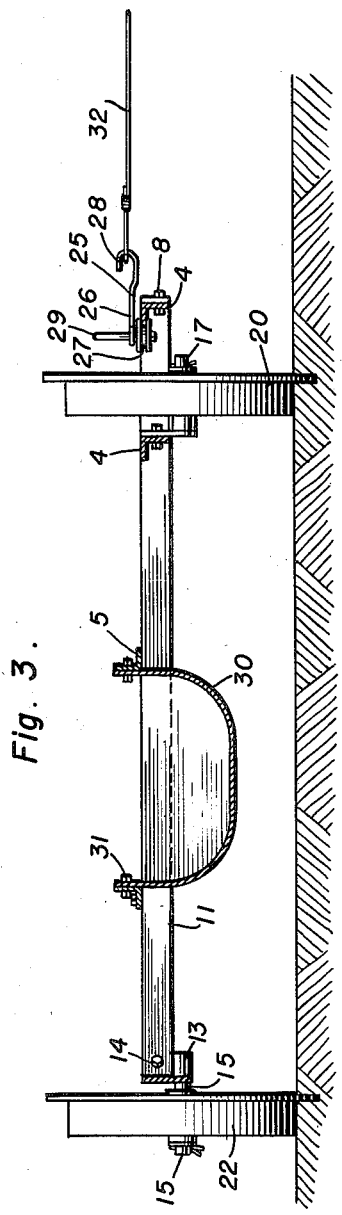
Inventor
John C. Engebretson
By *Clarence A. O'Brien and Harvey B. Jacobson*
Attorneys March 6, 1951 J. C. ENGEBRETSON 2,544,260
ANCHORING DEVICE FOR CHECK ROW WIRES
Filed June 3, 1947 3 Sheets-Sheet 3
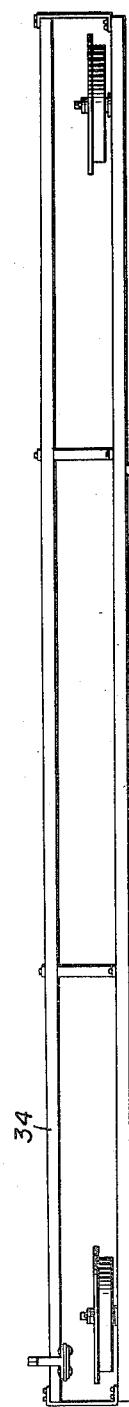
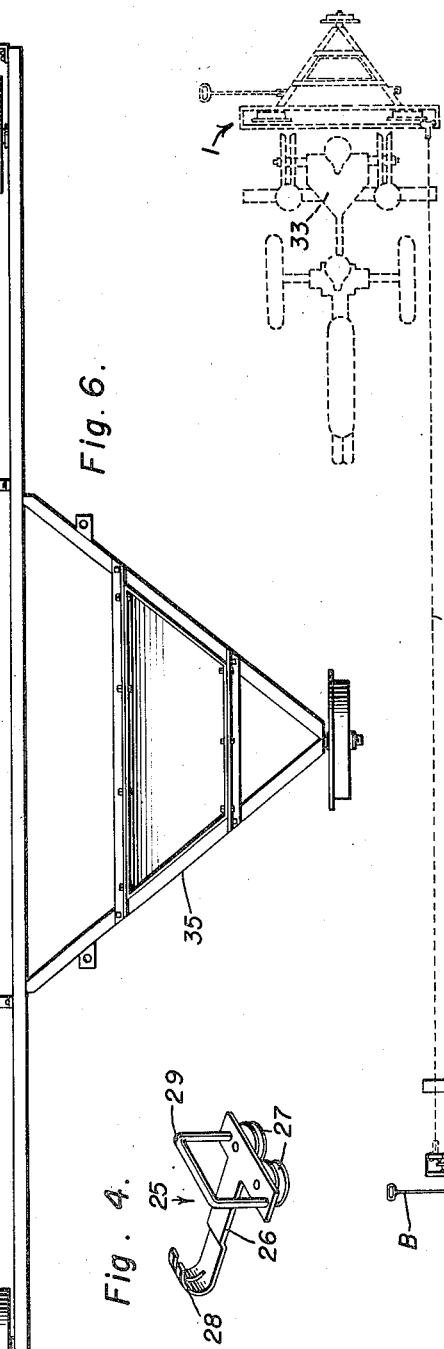
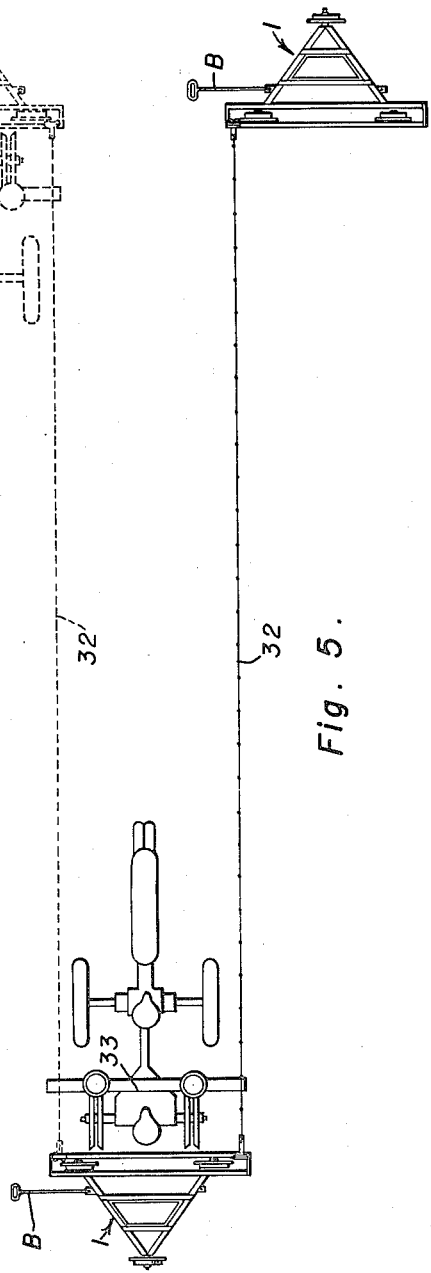
Inventor
John C. Engebretson Patented Mar. 6, 1951

2,544,260

UNITED STATES PATENT OFFICE 2,544,260

ANCHORING DEVICE FOR CHECKROW WIRES

John C. Engebretson, Montevideo, Minn.

Application June 3, 1947, Serial No. 752,141

1 Claim. (Cl. 111—49)

My invention relates to improvements in anchoring devices for check row wires such as are used in check row corn planters.

As is well known, such check row wires are usually anchored at the ends thereof by stakes between which the wire is stretched across a field and which must be relocated and driven into the ground preparatory to each course of travel of the corn planter crosswise of the field. Relocation and driving of the stakes is laborious and time consuming and is difficult to accomplish with accurate placing of the check row wire which frequently results in rows not being planted parallel and the proper width apart.

With the foregoing in mind, the primary object of my invention is to provide a simply constructed, easily handled device to take the place of such stakes, and the like, and for achoring such wires at the ends thereof quickly and accurately, as regards successive spacing of the wire, so as to save time and labor and obtain accurate row spacing in check row corn planting.

Another object is to provide a device of the character and for the purpose above indicated which is strong, will not get out of order, and is comparatively inexpensive to manufacture and use.

Other and subordinate objects, also comprehended by my invention, together with the precise nature of my improvements will be readily understood when the succeeding description and claim are read with reference to the drawings accompanying and forming part of this specification.

In said drawings:

Figure 2 is a view in rear elevation;

Figure 3 is a view in transverse section taken on the line 3—3 of Figure 1;

Figure 4 is a view in perspective of the trolley;

Figure 5 is a view in plan illustrating the use of the preferred embodiment of the invention;

Figure 6 is a view in plan of a modified embodiment of the invention for use with a four row check row corn planter.

Figure 1:
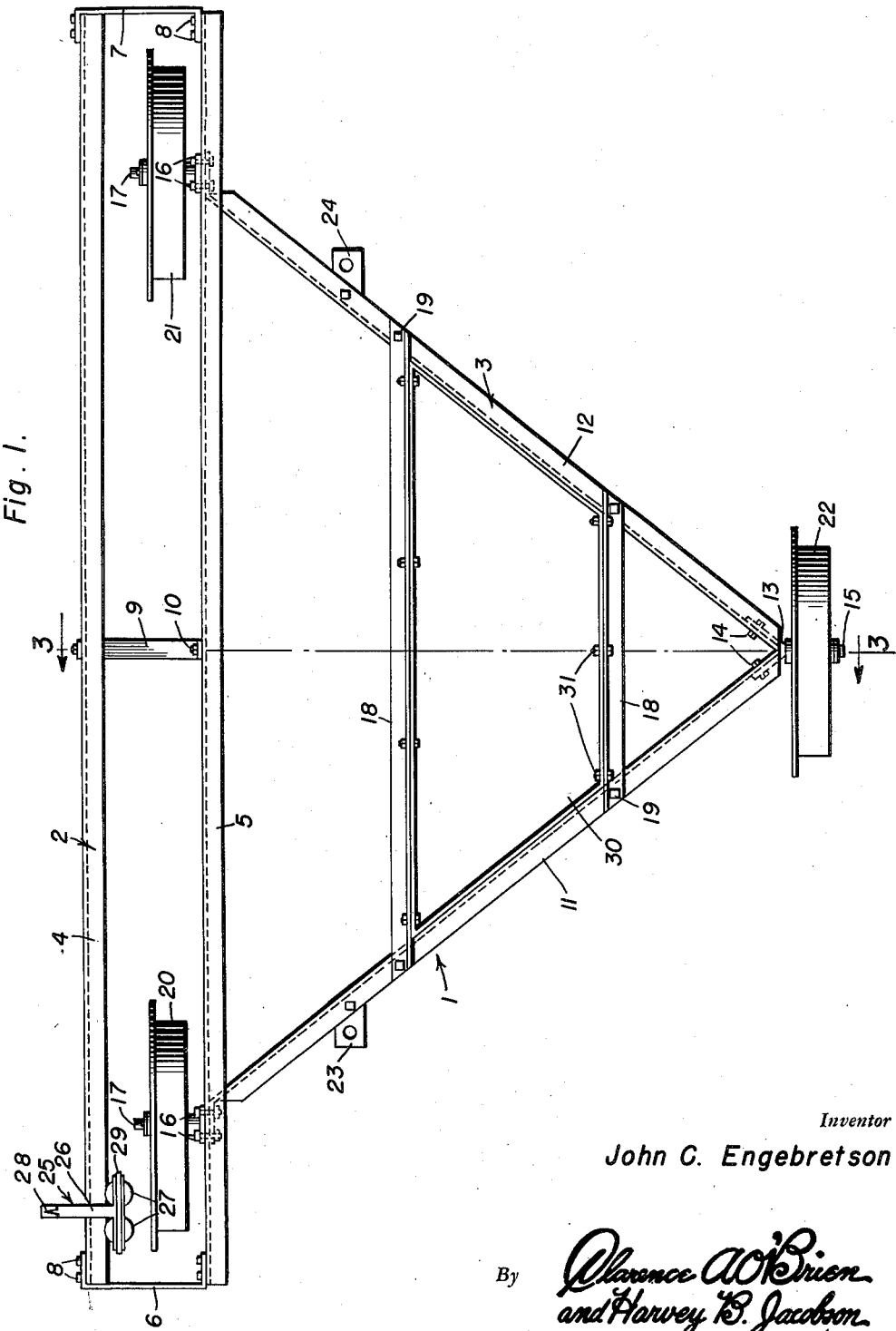
Figure 1 is a view in plan of a preferred embodiment of my invention adapted for use with a two row check row corn planter.

Referring now to the drawings by numerals, and first to Figures 1 to 5 thereof, according to my invention in the preferred embodiment thereof, a wheeled anchor truck 1 is provided, for use in a manner presently described, and which comprises a generally triangular frame formed of a main side frame section 2, and an outrigger frame section 3. The main side section 2 is of elongated rectangular, narrow, form with outer and inner longitudinal angle bars 4, 5, respectively, connected at the ends thereof by cross bars 6, 7 bolted thereto, as at 8, the outer bar 4 forming a track rail on the truck 1 for a purpose presently seen. Preferably, the main side frame section 2 is slightly longer than the width of the usual two row corn planter for a reason presently apparent. A center cross bar 9 bolted to the outer and inner longitudinal bars 4, 5, as at 10, braces said bars 4, 5.

The outrigger frame section 3 is V-shaped with a pair of side angle bars 11, 12 joined together at the outer ends thereof by an angle bracket 13 bolted thereto, as at 14, with an outwardly extending wheel spindle 15 thereon. The inner ends of the side bars 11, 12 are bolted, as at 16, to the inner bar 5 and spaced equidistantly from the ends of said frame section 2 so that said frame section 3 is centered in the middle of said frame section 2. Bolts 16 secure a pair of wheel spindles 17 to said inner bar 5 to extend laterally therefrom adjacent the ends of the main side frame section 2. A pair of parallel, laterally spaced, angle iron cross bars 18 are bolted, as at 19, to the side bars 11, 12 of the outrigger frame section 3 to brace the same.

A pair of flanged wheels 20, 21 are suitably retained on the spindles 17, as shown, and a similar wheel 22 on the spindle 15 so that the truck 1 is wheel supported adjacent the corners of the frame section 3 thereof, the flanged wheels acting to bite into the ground to prevent the truck from moving parallel to the axis of the wheels.

A pair of apertured, lateral lugs 23, 24 are provided on the side bars 11, 12 of the outrigger frame section 3 for connection thereto of a hook bar B to pull said truck 1 from one location to another in a field.

A trolley 25 is provided for movement along the outer bar 4 of the main side frame section 2. The trolley 25 comprises a T-shaped bar 26 adapted to overlie and slide upon said outer bar 4 with a pair of grooved wheels 27 on one end thereof adapted to ride along the rear edge of said outer bar 4, and an upturned, bifurcated hook 28 on its other end. A bail-type handle on said bar 26 provides a hand hold for moving said trolley 25 along said bar from side to side of the truck 1.

A bucket 30 of sheet iron, or the like, is fitted between the side bars 11, 12 and the cross bars 18 and bolted to said bars 18, as at 31. The bucket 30 is designed to be loaded with dirt, or the like, to act as ballast for stabilizing the truck 1, if necessary.

Referring now to Figure 5, in using the described embodiment of my invention, a pair of the trucks 1 are positioned at opposite sides of a field, to be planted, with the outer bar 4 facing the fields and the trucks staggered, relatively, upon opposite sides of a row location and with a check row wire 32 suitably attached at its ends to the hooks 28 of the trolleys 25 which are located on the outer bars 4 at relatively opposite sides of the trucks 1, as shown, the arrangement of the trucks 1 being such that said trucks are disposed one on the left and the other on the right hand side of a check wire, with respect to the direction of planting intended and as shown in full lines in Figure 5. A two row corn planter, shown conventionally at 33, coupled to the check wire 32 in the usual manner, is then driven from the truck on the left hand side of said wire 32 to the truck on the right hand side, to plant two rows. At the end of the two rows, the corn planter 33 is turned around for planting in the opposite direction and into the position shown in broken lines in Figure 5, the truck on the right hand side of the check wire 32, with said wire uncoupled therefrom, is then shifted sidewise, crosswise of the planted rows, to locate the same behind the planter and on the right hand side of said wire 32 in the opposite direction of travel of the corn planter 33 as shown in broken lines in Figure 6. The check row wire 32 is next coupled to the trolley 25 of the thus shifted truck 1, the truck reshifted and the trolleys 25 are moved along the outer bars 4 to dispose the check row wire 32 parallel with the planted rows and again at relatively opposite sides of the trucks 1. The corn planter 33 is now driven from the shifted truck 1, in connection with the check row wire 32, to the opposite truck 1 to plant two more rows of corn. These operations are repeated with the trucks 1 being shifted alternatively until the field has been planted to the extent desired.

In the modified embodiment of the invention shown in Figure 6, the arrangement is the same as previously described except that the main side frame section 34 of the truck 35 is slightly longer than the width of a four row check row corn planter, not shown, so that two of such trucks 35 and a check row wire may be used and manipulated in the manner described and in planting with four rows planted at a time.

The foregoing will, it is believed, suffice to impart a clear understanding of my invention, without further explanation.

Manifestly, the invention, as described, is susceptible of modification without departing from the inventive concept, and right is herein reserved to such modifications as fall within the scope of the appended claim.

Having described the invention, what is claimed as new is:

A device for anchoring a planter check row wire at one side of a field comprising an elongated rectangular side frame having parallel outer and inner side bars and a triangular outrigger frame secured to and extending outwardly from said inner bar; end ground wheels for said side frame journaled on said inner bar adjacent the ends thereof to rotate about axes transverse to said side bars; a ground wheel journaled on said triangular frame at the outer corner thereof to rotate about an axis parallel to the axes of said end wheels, a trolley having means to receive and hold one end of a check row wire, said trolley mounted for travel along the outer bar outwardly of said end wheels; and a bucket depending from said outrigger frame for containing ballast.

JOHN C. ENGEBRETSON.

REFERENCES CITED

The following references are of record in the file of this patent:

UNITED STATES PATENTS

| Number | Name | Date |
|---|---|---|
| 266,872 | Morris | Oct. 31, 1882 |
| 340,236 | Meyer | Apr. 20, 1886 |
| 476,149 | Kessler | May 31, 1892 |
| 613,305 | Porteous | Nov. 1, 1898 |